Patented Aug. 15, 1950

2,518,441

UNITED STATES PATENT OFFICE

2,518,441

METHOD OF MAKING WATER-SOLUBLE COFFEE EXTRACT

Johannes H. Schaeppi, Mitlodi, and Walter Mosimann, Glarus, Switzerland

No Drawing. Application June 29, 1948, Serial No. 35,984. In Switzerland December 15, 1947

2 Claims. (Cl. 99—71)

It is well known to those skilled in the art that the recovery of the fine aromatic substances contained in the coffee is a very delicate task and that the use of any chemical substances in such recovery should be avoided as far as possible.

On the other hand, when coffee is extracted with water in the usual manner, there also are dissolved certain substances, especially of albuminous character, which are altered during the drying process and therefore may affect the quality of the soluble coffee.

It is an object of our present invention to avoid the above named disadvantages by modifying the known method of making water-soluble coffee extract, by extracting roasted ground coffee, mixing the extract with water-soluble aroma-retaining ingredients, and concentrating and desiccating this mixture, in such manner that the extraction or lixiviation of the roasted and ground coffee is effected in the presence of substances which will precipitate and bind albuminous substances as well as other substances which otherwise would affect the aroma of the residue of desiccation in an undesirable manner, whereupon the extract is separated from the residue of extraction, brought to a pH-value corresponding to that of a normal coffee extract of equal concentration and made without addition, then freed from its water contents, and the dry residue admixed with aroma substances obtained by squeezing out roasted coffee powder.

It is a further object of the invention to carry out the extraction at temperatures not exceeding 100° C., preferably in the range between 85° C. and 100° C., and in less than 60 minutes, preferably in 15 to 45 minutes.

As substances for precipitating and binding the aroma-impairing substances, the compounds of alkaline earth metals and of other metals, especially the oxides and hydroxides thereof, are especially suitable.

As aroma-retaining substances, the following are particularly suited, and may be used in an amount of about 40 to 60%, preferably 50% of the weight of the finished dry product:

Mixtures of gum-arabic and lactose in an approximate proportion of 1:1, thickening mucilaginous vegetable substances as tragacanth, tapioca, sago, carrageen (Irish moss) etc.

The pH-value of the extract containing the aroma retaining substances is conveniently adjusted by adding innocuous organic acids such as tartaric acid, citric acid etc. The pH-value may vary from 4.7 to 5.4.

Example 3000 gms. of roasted coffee are finely ground and extracted with 10 liters of hot water containing 45 gms. of $Ca(OH)_2$ at a temperature of 98° C., filtered and squeezed out. The extract is admixed with a mixture of 300 gms. of gum-arabic and 300 gms. of lactose, and its pH-value adjusted to about 5 by the addition of tartaric acid. The solution then is evaporated and concentrated in vacuo until it has a specific weight of about 1.1, whereupon this concentrate is spray dried. The powder obtained in this manner, having a weight of 1200 gms., is mixed with 5 to 10 gms. of an oil obtained by squeezing out roasted coffee powder containing no additions. The residues of the latter squeezing process may be used as starting material for another extraction.

Instead of spray drying the concentrate, it is also possible to dry it with infra-red rays.

What we claim as new and desire to protect by Letters Patent of the United States is:

1. In a process of making a dehydrated water-soluble coffee-extract, the steps comprising extracting roasted and ground coffee at a temperature not exceeding 100° C. with water containing a sufficient amount of a substance capable of binding and precipitating the albuminous and albuminlike substances which would impair the taste of the dehydrated extract, said binding and precipitating substance being selected from the group consisting of calcium hydroxide and calcium oxide, filtering said extract, adding to the filtered solution a mixture comprising lacetose and gum-arabic as an aroma-retaining medium in an amount of 40 to 60% based on the total weight of the final dehydrated extract, adjusting the pH value of said solution to within a range between 4.7 and 5.4 by addition of an innocuous organic acid selected from the group consisting of tartaric acid and citric acid, thereafter dehydrating said solution and admixing the dry dehydrated extract powder with 0.4–0.8% of its total weight of an aromatic oil, obtained by squeezing roasted coffee powder.

2. A process according to claim 1 and in which the residues of the aromatic oil squeezing step process is used as starting material in the first extraction step.

JOHANNES H. SCHAEPPI.
WALTER MOSIMANN.

REFERENCES CITED

The following references are of record in the file of this patent:

UNITED STATES PATENTS

| Number    | Name          | Date          |
|-----------|---------------|---------------|
| 1,229,052 | Ewing         | June 5, 1917  |
| 1,428,256 | Romero        | Sept. 5, 1922 |
| 1,866,415 | Lorand        | July 5, 1932  |
| 1,925,159 | Wendt         | Sept. 5, 1933 |
| 2,036,345 | Merkel        | Apr. 9, 1936  |
| 2,338,608 | Weisberg et al. | Jan. 4, 1944 |
| 2,350,903 | Kellogg       | June 6, 1944  |